(12) United States Patent
Mons et al.

(10) Patent No.: US 7,857,581 B2
(45) Date of Patent: Dec. 28, 2010

(54) ANNULAR WIPER FOR A SEALING LABYRINTH, AND ITS METHOD OF MANUFACTURE

(75) Inventors: Claude Marcel Mons, Savigny le Temple (FR); Joel Olivier Alfred Abel Vigneau, Champcueil (FR)

(73) Assignee: Snecma, Paris (FR)

( * ) Notice: Subject to any disclaimer, the term of this patent is extended or adjusted under 35 U.S.C. 154(b) by 1078 days.

(21) Appl. No.: 11/560,100

(22) Filed: Nov. 15, 2006

(65) Prior Publication Data
US 2007/0110562 A1 May 17, 2007

(30) Foreign Application Priority Data
Nov. 15, 2005 (FR) .................................. 05 11579

(51) Int. Cl.
*F01D 11/12* (2006.01)

(52) U.S. Cl. ................. 415/173.5; 415/174.5; 277/415; 277/418

(58) Field of Classification Search ............... 415/173.5, 415/174.5, 230; 277/413, 415, 418, 419, 277/420, 568, 550, 421
See application file for complete search history.

(56) References Cited

U.S. PATENT DOCUMENTS 3,537,713 A * 11/1970 Matthews et al. ........... 277/415
5,660,320 A * 8/1997 Hoffmuller et al. ......... 228/122.1
6,478,304 B1 * 11/2002 Hoffelner .................... 277/415
2004/0012151 A1 * 1/2004 Beeck et al. ................. 277/415

FOREIGN PATENT DOCUMENTS

| DE | 474361 | 3/1929 |
|---|---|---|
| DE | 43 41 216 | 6/1995 |
| JP | 55-90229 | 7/1980 |
| JP | 61-61720 | 3/1986 |

OTHER PUBLICATIONS

U.S. Appl. No. 11/560,131, filed Nov. 15, 2006, Mons, et al.
U.S. Appl. No. 11/560,034, filed Nov. 15, 2006, Mons, et al.
U.S. Appl. No. 11/560,172, filed Nov. 15, 2006, Mons, et al.

* cited by examiner

*Primary Examiner*—Edward Look
*Assistant Examiner*—Aaron R Eastman
(74) *Attorney, Agent, or Firm*—Oblon, Spivak, McClelland, Maier & Neustadt, L.L.P.

(57) ABSTRACT

The invention provides a thermomechanical turbomachine part that is circularly symmetrical about a longitudinal axis, in particular a rotor, the part including at least one annular wiper for a sealing labyrinth. In characteristic manner, the wiper presents height in the radial direction that varies around its circumference by forming a plurality of projecting portions.

14 Claims, 2 Drawing Sheets

ANNULAR WIPER FOR A SEALING LABYRINTH, AND ITS METHOD OF MANUFACTURE

The invention relates to a thermomechanical turbomachine part that is circularly symmetrical about a longitudinal axis, the part including at least one annular wiper for a sealing labyrinth, the invention also relating to a method of fabricating the part and a turbomachine fitted with such a thermomechanical part.

BACKGROUND OF THE INVENTION

A sealing labyrinth, also known as a labyrinth seal, comprises a rotary portion having fins (or wipers) and a static bore covered in a soft abradable material or in a honeycomb structure capable of withstanding high temperatures. When the engine starts, the fins rub lightly against the lining, biting into it, thus leading to minimum spacing. This clearance varies over various cycles in flight, depending on the expansion of the part and on the natural flexibility of the moving portions.

The wipers of labyrinths serve to provide aerodynamic sealing between enclosures containing air at different pressures. They are generally situated on the rotor portion facing stator portions. They are mainly constituted by continuous or segmented "blades" of annular shape, capable of being directed radially inwards or outwards.

In particular, when they are continuous in shape, wipers are liable to come into contact with the stator in certain operating configurations. In order to avoid them being destroyed in such situations, stators are fitted with coatings that provide the interface and that are referred to as being "abradable". Under such circumstances, the usual sequences for wiper penetration into the abradable layer consist in a radial cut associated with an axial displacement ("straight turning").

In reality, the usual abradable materials can turn out to be relatively abrasive, in particular against certain continuous wipers, particularly if they are made of titanium-based alloy, but also if they are made of steel or of nickel-based alloy. This is particularly true when the abradable linings are made in the form of honeycombs of refractory alloy.

In order to avoid wipers being damaged, or even destroyed, they are commonly coated by thermally spraying (plasma torch, high velocity oxyfuel (HVOF), . . . ) an abrasive deposit of the alumina and titanium dioxide or carbide type, e.g. on an underlayer of aluminum and nickel alloy in order to provide bonding.

Deposition by thermal spraying requires relative spray angles to be complied with between the axis of the torch and the surfaces of the parts to be coated, so that the sprayed particles impact as close as possible to orthogonally on the surface for coating in order to obtain a deposit of satisfactory quality and with satisfactory bonding. That technique also requires a minimum distance between the spraying tool and the surface: the hot central zone of the flame from the torch can be at several thousands of degrees centigrade, so it must be kept far enough away from the part; in addition, the particles to be deposited must be accelerated sufficiently to adhere on the surfaces that are to be protected.

Furthermore, the propellant or plasma-generating gases used for spraying purposes must be easy to exhaust while ensuring that the sprayed powder is not "blown about" by creating turbulence.

In general, the wipers are oriented practically orthogonally to the cylindrical surfaces of the rotors, and they are often situated close to disk or labyrinth sheets at the bottoms of cavities or close to other wipers when they are placed in series.

Amongst these situations, numerous circumstances arise that present a geometrical arrangement that makes deposition by thermal spraying very uncertain or practically impossible.

OBJECTS AND SUMMARY OF THE INVENTION

An object of the present invention is to overcome that drawback by proposing a solution that makes it possible to avoid making a deposit by thermal spraying while nevertheless being able to make wipers that are not damaged by coming into contact with the abradable ring.

This object of the invention is achieved by the fact that the thermomechanical turbomachine part is fitted with a wiper which presents height in the radial direction that varies around its circumference, thereby forming a plurality of radially-projecting portions.

It will thus be understood that the wiper does not form a continuous blade of constant height, and because of the presence of distinct projecting portions, i.e. because of a wiper transverse profile having an outer outline that is not circular, it serves not only to perform a sealing function, but also acts like a "cutting tool". Thus, it is possible to omit depositing an abrasive coating.

In the invention, a continuous blade of constant section and coated by a protective deposit that is likewise continuous, is replaced by a wiper formed by a continuous or discontinuous blade made up of abrasive or cutting elements that result from different projecting portions distributed over different angular sectors.

In particular, provision is made for the wiper to form a discontinuous ring of section that presents a plurality of projecting portions around its circumference with gaps or breaks in height existing between them.

In this way, sawteeth are formed directly in the volume of the wiper, thereby making it easier to cut into the abradable material in comparison with a wiper constituted by a continuous blade.

The invention also provides a method of manufacturing an annular wiper for a sealing labyrinth on a thermomechanical turbomachine part that is circularly symmetrical about a longitudinal axis.

The present invention also provides a turbomachine including a thermomechanical part made in accordance with the method and/or in accordance with the description of said thermomechanical part.

The invention seeks to provide a method enabling such a wiper to be fabricated in simple manner without having recourse to depositing a coating.

According to the invention, this object is achieved by the fact that the method comprises the following steps:

a) providing a thermomechanical turbomachine part that is circularly symmetrical about a longitudinal axis, the part presenting an annular wiper of height in the radial direction that is substantially constant all around its circumference;

b) providing a machine tool having a hollow profile that is contained in the radial profile of the annular wiper;

c) machining at least one recess having a profile that is complementary to the hollow profile of the machine tool in the surface of the wiper by plunging the tool radially;

d) providing a U-shaped staple made of a material that is harder than the material of the part and having a hollow profile complementary to said recess;

e) placing said staple astride said recess, thereby providing local extra thickness at least in the radial direction; and f) securing the staple to said wiper.

It can thus be understood that the shape of the wiper is modified by two successive steps: machining by advancing a machine tool radially while the part is not rotating so as to form at least one hollow recess that subsequently receives a staple secured to the part and forms a local region of extra thickness relative to the remainder of the circumference surface of the wiper.

It will be understood that a wiper is made that, merely by its shape presenting varying height, specifically an extra thickness formed by the staple, is suitable for acting like a cutter to machine the abradable material, and that this is achieved without having recourse to making a deposit by thermal spraying.

In addition, the manufacturing method in accordance with the invention can be implemented regardless of the location or the arrangement of the wiper, in particular regardless of the space available around the wiper forming a portion of a thermomechanical part, in particular of a turbomachine rotor.

The invention can be well understood and its advantages appear better on reading the following detailed description of an embodiment of the invention described by way of non-limiting example.

BRIEF DESCRIPTION OF THE DRAWINGS

The description refers to the accompanying drawings, in which.

MORE DETAILED DESCRIPTION

Since the present invention relates to sealing wipers for a circularly symmetrical thermomechanical part of a turbojet, in particular for a rotor, the description below relates to one possible and non-limiting application of a wiper of this shape in accordance with the present invention.

Figure 1:
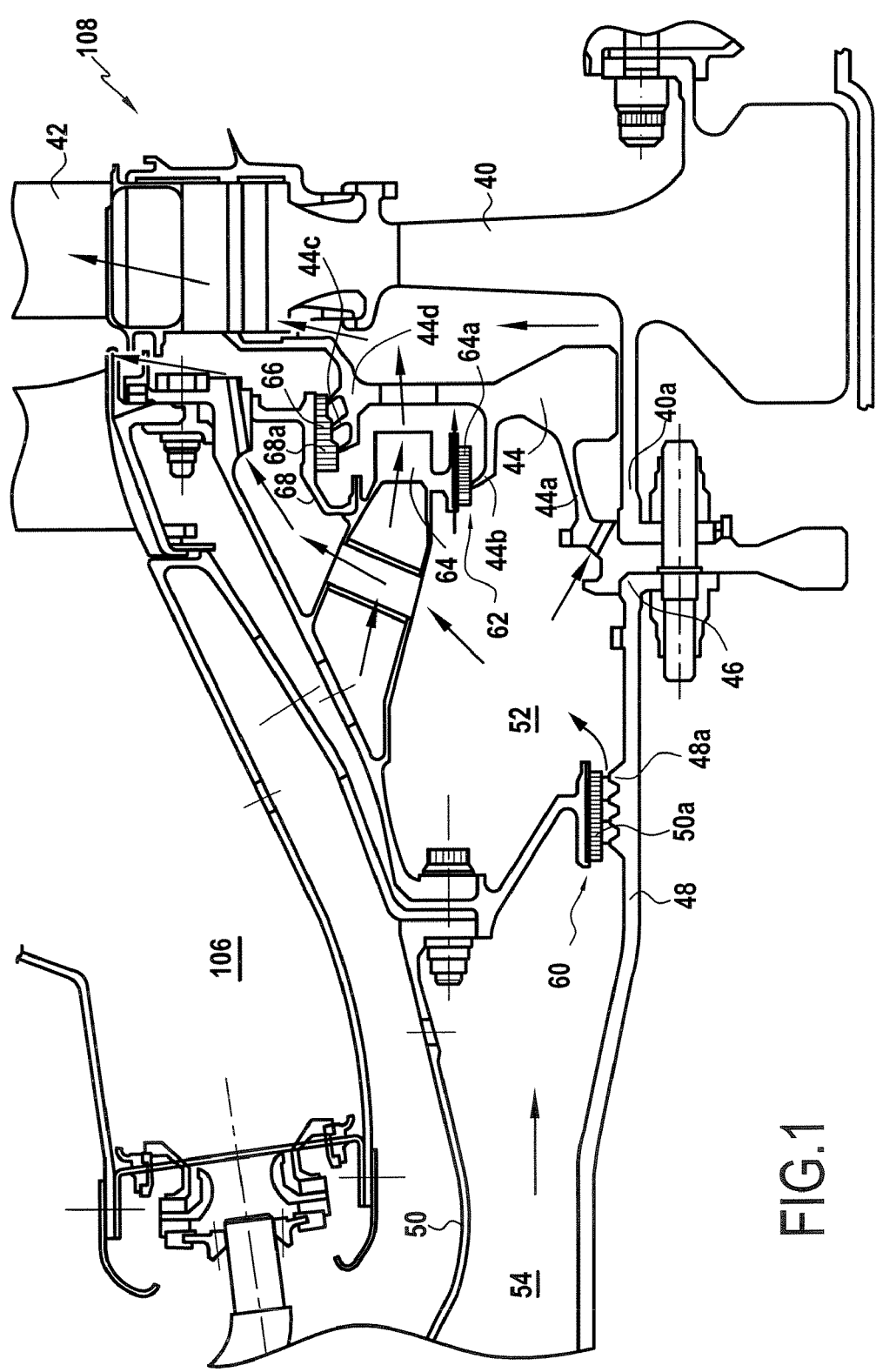
FIG. 1 is an axial half-section of a turbine rotor of a turbojet showing the disposition of the end plate and of the sealing labyrinth upstream from main injectors.

FIG. 1 shows a circumstance in which the wipers are used in sealing labyrinths and are disposed facing abradable elements. It relates to a ventilation circuit for a high pressure turbine disposed downstream from a combustion chamber 106.

In particular, there is a turbine 108 having its circularly symmetrical rotor movable in rotation about an axis X-X'.

The rotor of the turbine 108 comprises a turbine disk 40 fitted with blades 42, and an end plate 44 disposed upstream from the disk 40. Both the disk 40 and the end plate 44 have a respective upstream flange referenced 40a for the disk 40 and 44a for the end plate 44, enabling them to be secured to the downstream end 46 of the downstream cone 48 of the high pressure compressor driven by the rotor of the turbine 108.

This arrangement of the cooling circuit has three successive discharge labyrinths.

A first discharge labyrinth 60 is formed upstream from the enclosure 52 separating the end plate 44 from the end of the chamber, and downstream from the enclosure 54 separating the downstream cone 48 of the high pressure compressor from the inner casing 50 of the combustion chamber 106. This first discharge labyrinth 60 comprises wipers 48a formed on the downstream cone 48 and a ring 50a of abradable material mounted at the end of a plate secured to the inner casing 50.

A second discharge labyrinth 62 is situated under injectors 64, downstream from the enclosure 52. This second discharge labyrinth 62 is made up of wipers 44b of the end plate 44 and a ring of abradable material 64a mounted on the injectors 64.

The third discharge labyrinth 66 is situated above the injectors 64 and comprises three successive wipers 44c formed on an angled portion 44d of the end plate 44, and an abradable sealing ring 68a mounted on the inner casing 68.

According to the invention, all or some of the various wipers 48a, 44b, and 44c are of a shape presenting thickness that varies around their circumference, without any coating, and they are not in the form of a ring of constant thickness presenting a coating.

In FIG. 1, the present invention is shown in application with a high pressure turbine. Nevertheless, it should be understood that the present invention can be implemented in other zones of a turbomachine, in particular in a high pressure compressor, in a low pressure compressor, or in a low pressure turbine.

Likewise, in FIG. 1, the wipers are disposed on a moving rotor with all of them being directed radially outwards. Nevertheless, it will readily be understood that the present invention can apply equally to wipers that are directed radially inwards towards the axis of rotation.

By way of example, the present invention is described below with reference to FIGS. 2 to 6.

Figure 2:
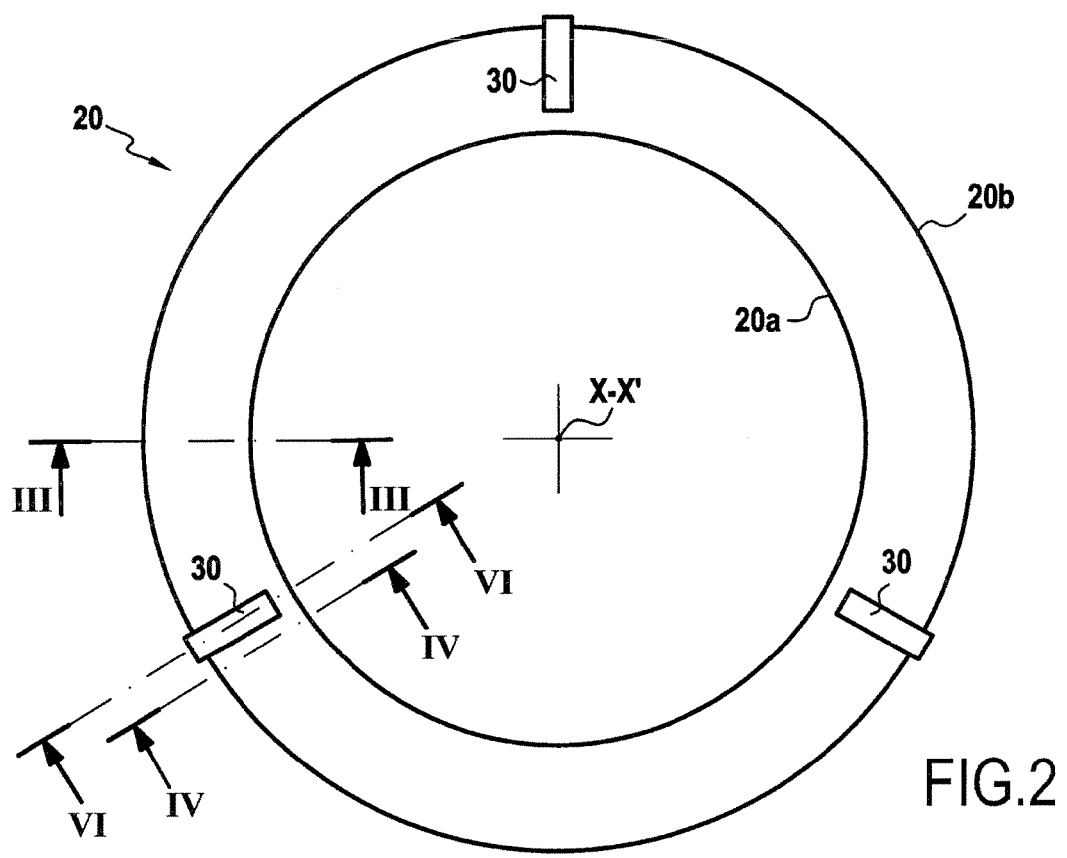
FIG. 2 is a view seen looking along the axis of a circularly symmetrical thermomechanical part presenting a wiper in accordance with the invention.

FIG. 2 shows the axis of rotation X-X' about which a wiper 20 extends radially, which wiper presents a circular inner outline 20a about the axis X-X' and an outer outline 20b that is almost circular. More precisely, the outer outline 20b is circular, i.e. it presents constant height around its circumference like an annular wiper of the prior art, with the exception of a plurality of locations (three in FIG. 2) where it presents extra height because of the presence of an added-on fitting constituted by a staple 30.

Figure 3:
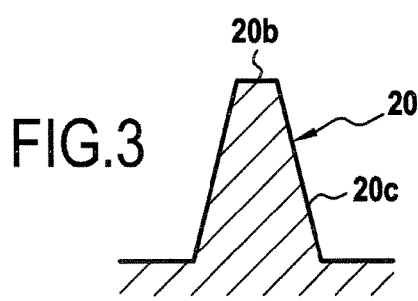
FIG. 3 is a radial section view on a larger scale showing the FIG. 2 wiper on line III-III of FIG. 2.

Away from the locations of the staples 30, the wiper 20 presents an outline in the form of an upside-down U-shape with the limbs that form the two side flanks 20c thereof being inclined and converging towards the top of the wiper 20 that forms the web of the U-shape, and constituted by the outer outline 20b of section that is substantially parallel to the axis of rotation X-X', as can be seen in FIG. 3.

Figure 4:
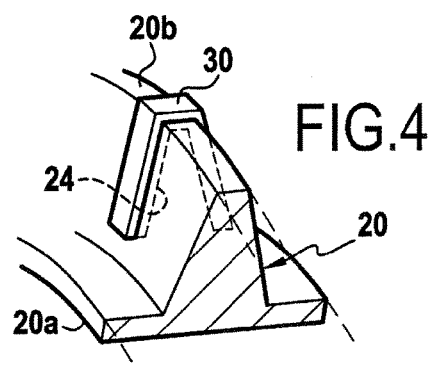
FIG. 4 is a fragmentary view on a larger scale of the wiper shown in perspective and in radial section on line IV-IV of FIG. 2.

As can be seen in FIG. 4, at the location of a staple 30, the wiper 20 is slightly taller and slightly wider, the staple 30 being positioned astride a major fraction of the height of the flanks 20c of the wiper 20 (e.g. over 2 millimeters (mm) to 12 mm).

Figure 5:
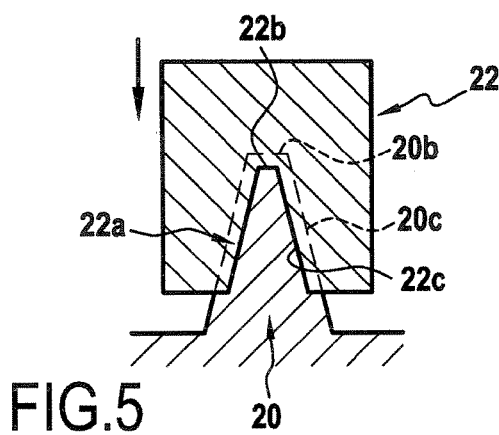
FIGS. 5 and 6 are enlarged views respectively in radial section and in perspective together with a radial section on line VI-VI of FIG. 2 showing the wiper during two different steps of the method of manufacture in accordance with the invention.

Prior to mounting the staples on the wiper 20, local recesses 24 are formed in the outer profile of the wiper 20 using a machine tool, e.g. formed by an electrode 22 of an electro-erosion machine (e.g. an "Electro-Discharge Machine" or a machine for machining by an electrolytic method), such as the electrode 22 visible in FIG. 5.

For this purpose, the hollow profile of the cutting zone 22a of the electrode 22 presents a section that is likewise U-shaped with its limbs forming inclined walls 22c that converge towards the web 22b and forming substantially the same acute angle as is formed by the flanks 20c of the wiper 20.

Nevertheless, in order to cut simultaneously both into the flanks 20c and into the outer outline 20b forming the top of the wiper 20, the cutting zone 22a of the electrode 22 presents a web that is narrower than the width of the outer outline or top 20b of the wiper 20 in the direction of the axis of rotation X-X'.

Figure 6:
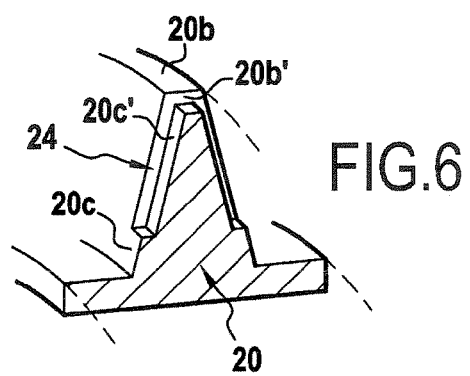

In order to obtain the recess 24 having the section that can be seen in FIG. 6, the electrode 22 is plunged against the part carrying the wiper 20 while that part is stationary, and in particular while it is not rotating. Since the inclined walls 22c of the electrode 22 present a height that is perceptibly shorter than the height of the flanks 20c of the wiper, the flanks 20c in the recess 24 are machined over a fraction only of their height from the outer outline 20b, as can be seen in FIG. 6.

In this way, in the recess 24, the outer outline of the wiper 20 corresponds to the top 20b' being situated lower than the outer outline 20b, while the flanks 20c' of the recess 24 are closer together than are the flanks 20c of the remainder of the wiper 20.

Thereafter, a staple 30 prepared beforehand by machining, or preferably by molding or compacting metal, ceramics, and/or carbides, using powder metallurgy (PM), or using a metal injection molding (MIM) method.

Such a staple 30 is made of a material that is harder than that of the wiper.

Thereafter, the staple 30 is secured to the wiper 20, e.g. by brazing.

In particular, specifically if the wiper is made of a titanium alloy (e.g. situated facing a honeycomb abradable lining made of nickel, molybdenum, and chromium alloy, in particular of the Hastelloy X (registered trademark) type the staple is made of steel or of superalloy or of ceramic, with the brazing connection being made of additional brazing composition of the Ti Cu Ni type.

According to the invention, the wiper 20 presents different heights (in particular constant heights), in different angular sectors, i.e. depending on whether or not a staple is present in the annular sector under consideration, it being observed that each staple extends over an annular sector that is very small, being of the order of 1 to a few degrees for thickness close to 1 millimeter.

Under such circumstances, it can be observed that with the exception of the projecting portions corresponding to the locations of the staples 30, the wiper 20 presents a height that is substantially constant.

In addition, because of the presence of the staple 30, preferably at least one outer layer of the projecting portions is made of a material that is different from that of the remainder of the wiper 20.

More precisely, each projecting portion comprises a core made of the same material as the support forming the initial annular wiper 20, and a zone surrounding the core over the tip of the wiper 20 that is formed by the staple 30 which is made of a different material.

It will be understood that in general, at least the outer layer of the projecting portions is made using a separate part, i.e. the staple 30, that is connected to the wiper 20.

As an indication, it is possible to envisage implementing the invention for thermomechanical parts, in particular rotors, that are made of steel or of a superalloy based on nickel and that are to be positioned facing an abradable ring of a metal material that is deposited by plasma spraying (e.g. a nickel/graphite or indeed a nickel—chromium—aluminum/benzonite deposit), or indeed an abradable lining in the form of a honeycomb of nickel molybdenum chromium alloy (of the Hastelloy X (registered trademark) type).

Under such circumstances, the staples 30 are preferably made of a self-brazing abrasive material and they can be made by diffusion brazing build-out, or they can be made of a cutting ceramic by performing the brazing using a brazing composition, e.g. melted by a laser beam.

In addition, each projecting portion (staple 30) presents a maximum height standing proud of the minimum height of the wiper (20) by about 0.2 mm.

In the above, wipers 20 are described having three projecting portions (staples 30), however some other number could be provided comprising at least two or more than three, providing they are distributed regularly around the circumference. Preferably, the wiper 20 has at least three projecting portions (30) that are regularly distributed angularly.

Furthermore, in the drawings, there can be seen an annular wiper that projects radially outwards, however the present invention can equally well be applied to an annular wiper that projects radially inwards.

It is also possible (in circumstances not shown) to use a staple of varying thickness to provide a tooth presenting a different shape because each projecting portion presents a height that increases progressively from a gap up to a tip and then decreases progressively from said tip to the following gap.

What is claimed is:

1. A thermomechanical turbomachine part that is circularly symmetrical about a longitudinal axis, the part comprising:
   at least one annular wiper for a sealing labyrinth, wherein the wiper presents a varying height in a radial direction around its circumference, forming a plurality of projecting portions,
   wherein each of the projecting portions includes a U-shaped staple which is secured astride the wiper in a hollow recess formed in the wiper, said staple having a profile that is complementary to that of the wiper.

2. A thermomechanical part according to claim 1, wherein the wiper forms a ring of discontinuous section, presenting around its circumference a plurality of projecting portions between which there exists gaps or breaks in height.

3. A thermomechanical part according to claim 2, wherein each projecting portion presents a height that increases progressively from a gap up to a tip and decreases progressively from said tip down to the following gap.

4. A thermomechanical part according to claim 1, wherein the wiper presents different heights in different angular sectors.

5. A thermomechanical part according to claim 4, wherein the wiper presents a height that is substantially constant, with the exception of the projecting portions.

6. A thermomechanical part according to claim 4, wherein at least outer layers of the projecting portions are made of a material that is different from the material of the remainder of the wiper.

7. A thermomechanical part according to claim 6, wherein at least the outer layers of the projecting portions are made using separate parts connected to the wiper.

8. A thermomechanical part according to claim 1, wherein each projecting portion presents a maximum height projecting proud above the minimum height of the wiper of about 0.2 mm.

9. A thermomechanical part according to claim 1, wherein the wiper has at least three projecting portions that are regularly distributed angularly.

10. A thermomechanical part according to claim 1, forming a turbomachine rotor.

11. A thermomechanical part according to claim 1, wherein the annular wiper is directed radially outwards.

12. A turbomachine, including a thermomechanical part according to claim 1.

13. A thermomechanical part according to claim 1, wherein an inner surface of the staple cooperates with the hollow recess formed in first and second side flanks and an outer outline of the wiper and an outer surface of the staple extends beyond the outer outline of the wiper.

14. A thermomechanical part according to claim 1, wherein the staple is secured to the wiper by brazing.

* * * * *